United States Patent
Rossi et al.

(10) Patent No.: US 6,876,799 B2
(45) Date of Patent: Apr. 5, 2005

(54) GEL-SWELLABLE LAYERS ON FIBERS, FIBER RIBBONS AND BUFFER TUBES

(75) Inventors: Michael T. Rossi, Maiden, NC (US); Nicholas V. Nechitailo, Conover, NC (US); Brian Risch, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/851,247

(22) Filed: May 9, 2001

(65) Prior Publication Data
US 2002/0168155 A1 Nov. 14, 2002

(51) Int. Cl.$^7$ .................................................. G02B 6/00
(52) U.S. Cl. ........................ 385/109; 385/113; 385/123
(58) Field of Search .................................. 385/109, 100, 385/110, 113, 114, 123

(56) References Cited

U.S. PATENT DOCUMENTS

| | | |
|---|---|---|
| 4,645,298 A | 2/1987 | Gartside, III |
| 5,029,974 A | 7/1991 | Nilsson |
| 5,031,996 A | 7/1991 | Saller et al. |
| 5,062,685 A | 11/1991 | Cain et al. |
| 5,373,578 A | 12/1994 | Parker et al. |
| 5,408,561 A | 4/1995 | McCallum, III et al. |
| 5,446,821 A | 8/1995 | Nonaka et al. |
| 5,509,097 A | 4/1996 | Tandi-Resta et al. |
| 5,621,842 A | 4/1997 | Keller |
| 5,698,615 A | 12/1997 | Polle |
| 5,761,361 A | 6/1998 | Pfandl et al. |
| 5,911,023 A | 6/1999 | Risch et al. |
| 6,035,087 A | 3/2000 | Bonicel et al. |
| 6,041,153 A | 3/2000 | Yang |
| 6,085,009 A | 7/2000 | Risch et al. |
| 6,085,010 A | 7/2000 | Zahora et al. |

FOREIGN PATENT DOCUMENTS

| | | |
|---|---|---|
| EP | 0 422 573 A2 | 4/1991 |
| EP | 0 510 967 A2 | 10/1992 |
| WO | WO 01/14922 A | 3/2001 |

*Primary Examiner*—Rodney Bovernick
*Assistant Examiner*—Sung Pak
(74) *Attorney, Agent, or Firm*—Sughrue Mion, PLLC (57) ABSTRACT

The present invention adds a gel-swellable layer in fiber optic cables to aid in protecting the fibers within the cable. The gel-swellable layer can be placed on the fibers, individual ribbons, stacks of ribbons and on the inner surface of tubes by various methods, such as co-extrusion, and can be cured by either heat curing or UV curing. The gel-swellable layers of this invention can be either smooth or textured. When the fibers are placed into the tubes and the tubes are filled with the water resistant gel, the gel-swellable layer absorbs some of the gel causing it to "swell". As a result of the "swelling" a certain volume of gel is absorbed by the layer, thus reducing the capability of the gel to flow at elevated temperatures.

27 Claims, 7 Drawing Sheets

GEL-SWELLABLE LAYERS ON FIBERS, FIBER RIBBONS AND BUFFER TUBES

BACKGROUND OF THE INVENTION

1. Field of the Invention

The present invention generally relates to the field of optical fibers, in particular a fiber optical cable, ribbon, fiber or buffer tube having a gel-swellable layer for added protection and stability of the fibers in the cable structure.

2. Discussion of Related Art

Optical fibers are very small diameter glass strands which are capable of transmitting an optical signal over great distances, at high speeds, and with relatively low signal loss as compared to standard wire or cable (including wire cable) networks. The use of optical fibers in today's technology has developed into many widespread areas, such as: medicine, aviation, communications, etc. Many of the areas of use for optical fibers, such as communications, require the optical fibers be protected from various destructive factors, such as adverse weather, moisture, impact damage, etc. This protection for the fibers can come in various ways.

One common way to protect fibers, or fiber ribbons, is to have a water resistant gel placed between the individual fibers, or fiber ribbons, and the cable buffer tubes, or the fiber ribbon stacks and the buffer tubes. This water resistant gel minimizes the amount of water or moisture that enters the fiber optic cable and protects the fibers from impact damage during installation, storage, repair, etc. An example of such a gel, along with its characteristics can be found in U.S. Pat. No. 6,085,009 to Risch et al., which is incorporated herein by reference.

One requirement for fiber optic cables is that the water-blocking gel within a fiber-optic cable does not exude out the end of the cable, even at elevated temperatures. Satisfactory resistance to flow of the waterblocking gel may be problematic especially for large diameter cables at high temperatures. Attenuation in individual fibers (loss of signal power in the fibers) may also be a problem in large cables containing fiber ribbons. In this case attenuation is generally attributable to microbending in the fibers, which tends to occur when the outer most fibers make contact with the walls of the buffer tubes or outer jackets. This is most common in the outer most fibers (corners) of ribbon stacks.

This is particularly true in fiber optic cables having large diameter (larger than 0.310") buffer tubes where the cross-sectional area of the gel layer becomes so large that the gel is not stable, and will not provide adequate damage or moisture protection. Therefore, the use of only a gel layer between the fibers and buffer tube (or outer jacket) of a cable limits the overall size the cable can be, to ensure adequate protection of the fiber(s).

One common test for determining whether or not a protective gel material is adequate, is having the sample cable (with the gel compound) cut and vertically positioned in an oven. The temperature in the oven is then raised to approximately 70° C. for a period of 24 hours. As the temperature of the compound or gel increases the viscosity and yield stress of the compound or gel decreases. When the viscosity and shear stress decreases, to a certain point, the gel or compound will drip or leak from the cut portion of the cable. This dripping or leaking is evidence that the particular gel or compound is not acceptable or the tube size is too large compared to a relatively small fiber bundle or ribbon stack for applications in fiber optic cables where such conditions may exist (i.e. higher temperatures).

In general, the compound or gel flow is governed by a number of different factors, such as: gravity, yield stress of the material, oil separation in the material, viscosity of the materials, coefficient of expansion of the material, adhesion or slippage of the material or compound to the walls of the buffer tube or outer jacket, and the diameter (cross-sectional area of the gel) of the cable.

SUMMARY OF THE INVENTION

The present invention is directed to eliminating the above problems with using a protective gel or compound layer in fiber optic cables.

The present invention addresses the problems recited above by adding a "gel-swellable" layer onto either the individual fibers or onto groupings of fibers, such as individual fiber or a stack of ribbons, or as a second layer for dual-layer gel-swellable buffer tubes. Materials such as swellable polyolefin or styrene copolymer are among some of the materials that can be used as the gel-swellable material on the fibers, ribbons, or for the dual-layer gel-swellable buffer tubes.

The gel-swellable layers can be placed on the fibers or stacks by various methods, such as co-extrusion, and can be cured by either heat curing or UV curing. In effect, the gel-swellable layer adds a third layer on individual fibers, as it is deposited on top of the secondary coating, or adds a layer on top of the matrix material used to bind a ribbon or ribbon stack. The individually coated ribbons may be lubricated due to the swelling and thus slide with respect to each other in the stacks. This lubrication effect reduces stress under various thermo-mechanical loading conditions.

The gel-swellable layers of this invention can be either smooth or textured (i.e. corrugated, longitudinal grooves, etc.). When the fibers are placed into the tubes and the tubes are filled with the water resistant gel, the gel-swellable layer absorbs some of the gel causing it to "swell". From this point of view, an initial concentration of gel may have increased concentration of oil to be absorbed by swelling coatings on the fibers, ribbons and inner surface of the tube. As a result of the "swelling" a certain volume of gel is absorbed by the layer, thus reducing the capability of the gel to flow at elevated temperatures. Additionally, the swelled layers create a desirable stiffness transition from harder (less swelled) particles at the surface of the fiber to softer (more swelled) particles on the surface of the swelled layer. This variable-stiffness swelled layer then acts as a bumper and positioning structure between the fibers and the buffer tube or outer jacket, keeping the fibers in the center of the tube, and preventing gel flow at higher temperatures.

Further, the swelling action results in the absorption of the lower-viscosity components of the gel, thereby reducing the likelihood of oil separation in the gel, which leads to gel breakdown. Finally, the gel-swellable layer reduces the effective cross-section of the gel material in a tube or cable, which again aids the gel in reducing dripping and overall maintaining its stability to protect the optical fibers.

BRIEF DESCRIPTION OF THE DRAWINGS

The advantages, nature and various additional features of the invention will appear more fully upon consideration of the illustrative embodiment of the invention which is schematically set forth in the drawings, in which.

DETAILED DESCRIPTION OF THE INVENTION

The present invention will be explained in further detail by making reference to the accompanying drawings, which do not limit the scope of the invention in any way.

Figure 1:
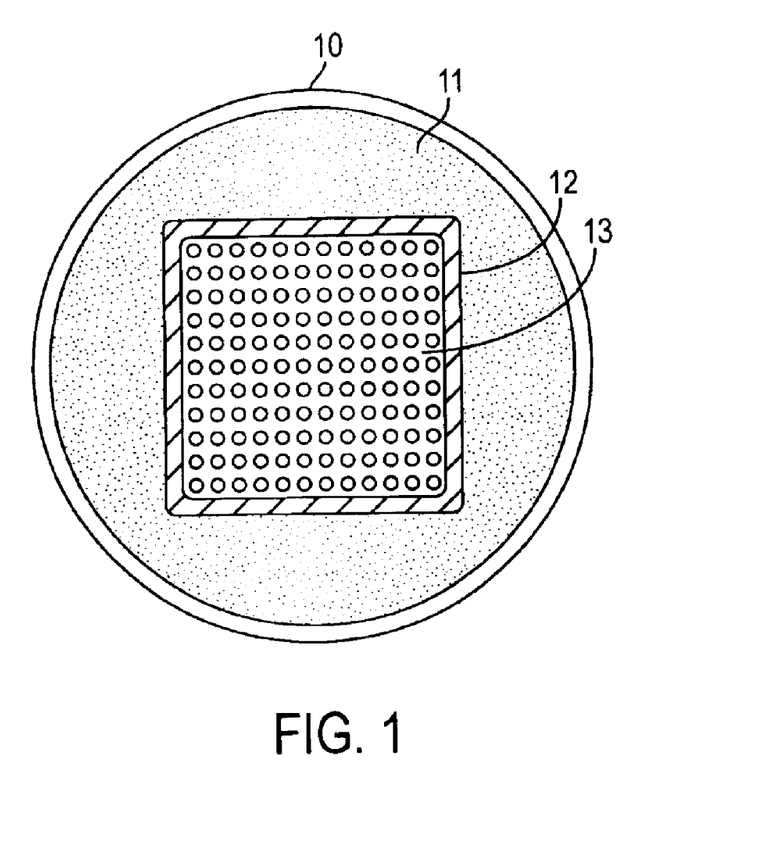
FIG. 1 is a diagrammatical representation of a fiber optical cable with a ribbon stack and the gel-swellable layer of the present invention.

Turning now to FIG. 1, a fiber optic cable is shown, where the cable (in the central-tube configuration) has an outer jacket 10, a ribbon stack 13, a protective gel 11 and a gel-swellable layer 12. The outer jacket 11 can be of any commonly used or known material, size and shape, and is not limited in any way by the present invention. Moreover the outer jacket 11 does not have to be the outer jacket of the cable, but can be one of many buffer tubes in a cable. The ribbon stack 13 can also be comprised of any number of individual ribbons or optical fibers. Any conventional or known ribbon stack configuration may be used with the present invention. Further, the fibers do not have to be in a ribbon stack configuration, but can be wound in a helical pattern grouped as a fiber bundle, can be placed loosely or individually, or configured in any known or conventional manner within the tube 10. The configuration or positioning of the fibers or fiber ribbons 13 within the tube 10 is not critical to the present invention, although preferably the fiber should be approximately centered within the tube 10 to provide the maximum protection for the fibers on all sides of the tube 10.

The gel material 11 can also be of any commonly known or used gel material. It is preferable that the gel material 11 provide moisture or water protection, as well as shock absorbing characteristics. Depending on the application of the fiber or cable the gel 11 should also have good viscosity characteristics at higher temperatures (above 70° C.) to avoid having the gel lose its protective characteristics. An example of the gel that can be used can be found in U.S. Pat. No. 6,085,009 to Risch et al., which is incorporated herein by reference. Examples of suitable gel formulations include gels comprised of mineral oils and/or synthetic polyolefin oils combined with a polymeric thixotropy modifier or pyrogenic silica. Further, gels such as commercially available Mastergel R-1806 and R-1806LT can be used.

Figure 2A:
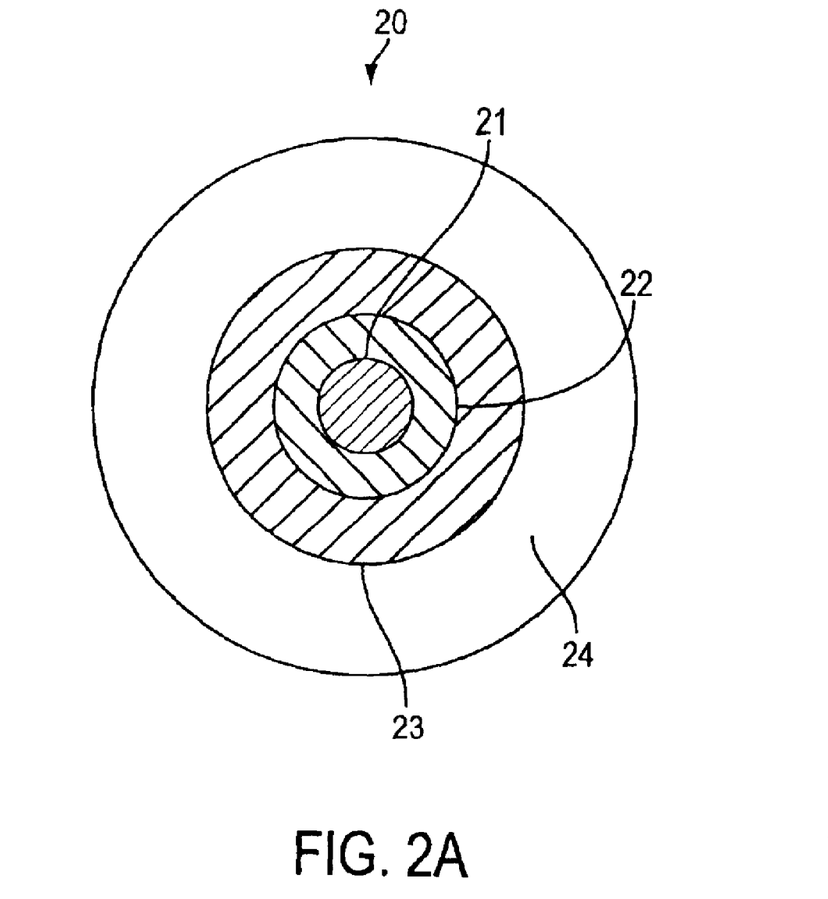
FIG. 2A is a diagrammatical representation of a single optical fiber with a gel-swellable layer of the present invention.
Figure 2B:
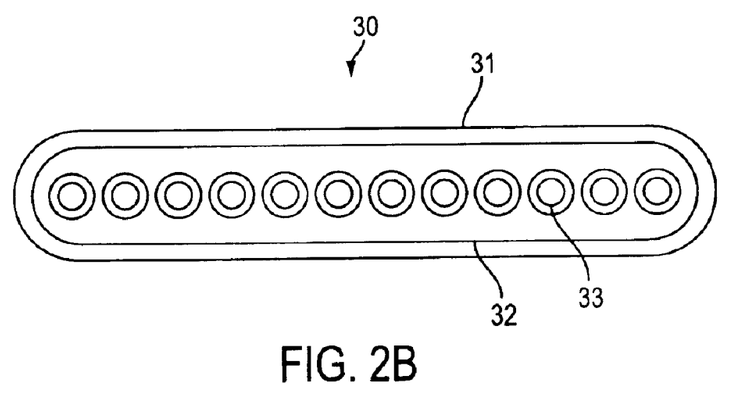
FIG. 2B is a diagrammatical representation of a fiber optic ribbon with a gel-swellable layer of the present invention.

The gel-swellable layer 12 can be deposited on the ribbon stack 13 or the fibers by any commonly known or used method of depositing a layer onto such items, including co-extrusion. Further, the gel-swellable layer 12 can be cured by any commonly known or used method, such as heat or UV curing. The layer 12 can be either smooth or have an uneven shape, with ridges and valleys, channels, corrugation, etc. either running longitudinally along the length of the cable or concentrically. Further, it is not required that the layer 12 be continuous around the perimeter of the ribbon stack 13 or fibers, as shown in FIGS. 1–2B. The layer 12 can be made up of separate longitudinal strips running the length of the cable or fiber or may have a number of patches of gel-swellable material, which are placed along the length of the fiber or cable, but do not necessarily run the entire length of the cable or fiber. Moreover, although preferred, it is not necessary for the gel-swellable material to be placed or secured on the ribbon stack, or fiber, but it can be secured on the inside surface of the jacket or tube 10, or can be "floating" in the gel material between the jacket or tube 10 and the ribbon stack 13 or fibers. Further, it is possible to use more than one gel-swellable layer to optimize fiber performance.

In a preferred embodiment, a polyolefin swellable type material is to be used for the gel-swellable material. The preferred density of the gel-swellable coating is less than 0.90 g/cc which would give a swelling interaction of greater than 10% at 85° C. in polyolefin oil-based filling gels. Styrene copolymer materials can also be used as the layer 12. Another useful class of compounds for such an application that are highly swellable are ethylene-styrene interpolymers. In another preferred embodiment, a copolymer or terpolymer of polyethylene with a density of less than 0.90 g/cc is used as the gel swellable layer.

However, any material which demonstrates any type of gel-swelling characteristics can be used, and the materials chosen for both the protective gel 11 and the gel-swellable layer 12 can be altered to optimize the protective characteristics of both the gel 11 and the gel-swellable layer 12. A desirable attribute to be achieved is to have the gel-swellable material absorb some of the lower-viscosity components of the protective gel, thereby reducing the likelihood of oil separation in the protective gel. Further, as the layer 12 absorbs some of the gel 11, the layer 12 should swell in size, growing larger and softer, therefore providing more protection for the fibers and effectively reducing the cross-section of the gel material, thus decreasing the tendency of the gel to flow at higher temperatures. (The reduction of the effective cross-section of the gel, reduces the cross-section of the gel on which the gravitational forces would act on during flow testing.) Further, the swellable layers of the present invention create soft bumpers or cushions for the fibers in the cables, and act as self-aligning members ensuring proper positioning of the stack 13 or fibers within the tube 10. It should be noted, however, that it is preferred to use materials for both the gel 11 and the gel-swellable layer 12 to optimize the above characteristics and advantages, but such optimization is not necessary for the present invention, and the characteristics desired may vary from application to application, depending on the intended use of the cable or fiber.

Figure 3:
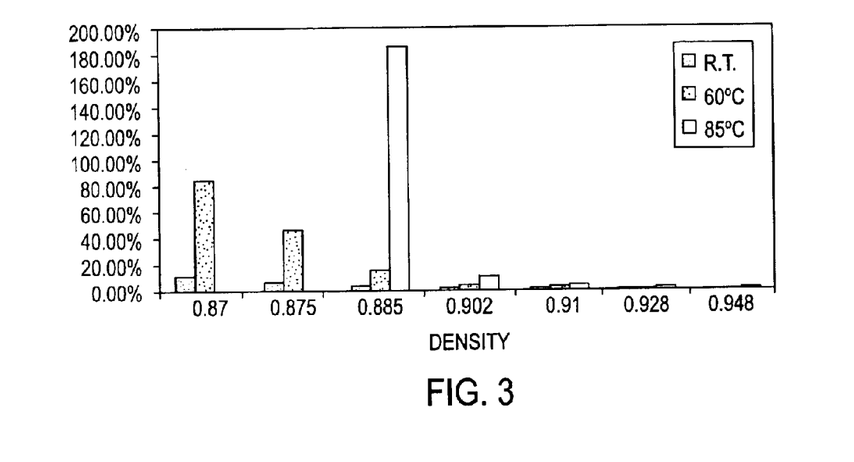
FIG. 3 is a chart showing the effects of temperature on the swelling of Polyethylene.
Figure 4:
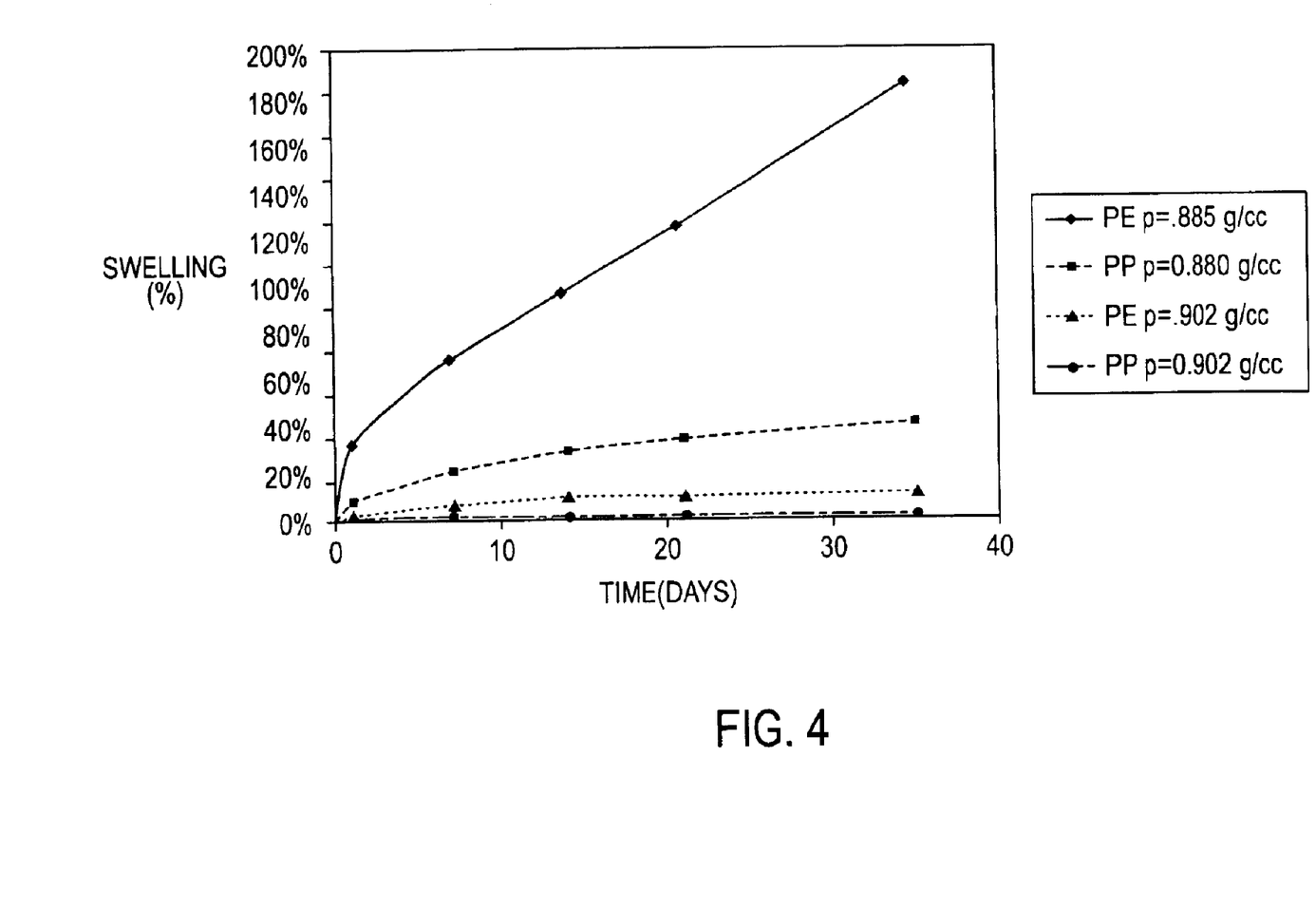
FIG. 4 is a chart showing the effect of material type and density on the swelling of the materials at 85° C.

Several polyolefin copolymers, suitable for use in the present invention, have been studied. FIG. 3 depicts the swelling (% swelling on the vertical axis) of polyethylene as a function of temperature (Room Temperature, 60° C., and 85° C.) and density, and FIG. 4 depicts the effect of material type and density on swelling at 85° C., where PE is a polyethylene material and PP is a polypropylene material. As shown in FIG. 3, the swellability of different material densities at 85° C. can be anywhere from moderately swelled to totally miscible. It is desirable to have a gel-swellable material where the swellability varies as a function of temperature. Further, it is desirable to have the material chosen for the gel-swellable layer be softer than that used for the outer jacket or tube 10, which is normally a polypropylene copolymer type material, which typically has a density greater than 0.900 g/cc. Typically, swelling of the jacket materials at 85° C. reaches a maximum value of less than 3% with a polyolefin oil based gel. (The characteristics of such a gel are discussed in U.S. Pat. No. 6,085,009). As shown in FIG. 4, both polethylenes and polypropylenes with a density below about 0.89 g/cc are substantially swellable with a polyolefin based gel. Therefore, when this type of material is used for the gel-swellable layer, the gel-swellable layer will absorb some of the gel while the buffer tube or jacket 10 would remain substantially unaffected.

Examples of materials suitable for the gel filling materials include polyolefin oil-based filling gel. Overall the gel-swellable materials in the form of strings, coatings, etc. include ethylene-octene copolymers, propylene-ethylene copolymers, ethylene-octene-propylene terpolymers or other similar copolymers or terpolymers. Other suitable materials for such an application, which are highly swellable, are ethylene-styrene interpolymers. In the preferred embodiment, low-density polyethylene, with a density less than 0.90 g/cc is used as a gel-swellable layer on the fibers, ribbons and ribbon stacks.

It should be further noted that the further refinements of material selection and material combination can be accomplished to optimize the protective characteristics of both the gel and gel-swellable layer combination under various different potential environmental conditions. Further, it is contemplated that the performance of the present invention can be enhanced by the use of additional fillers, strings, or yarns commonly known or used in the art, either placed in the gel material, or secured to the gel swellable layer to provide additional fiber or cable protection, and aid in maintaining the stability of the gel-swellable layer.

FIGS. 2A and 2B show a typical optical fiber and fiber ribbon, respectively, with the gel-swellable layer of the present invention. FIG. 2A shows a typical individual fiber 20 having the glass fiber 21, a primary coating 22, secondary coating 23, and a gel-swellable layer 24. FIG. 2B shows a typical twelve fiber ribbon 30 having twelve fibers 33 positioned in a matrix material 32 and gel-swellable material layer 31.

Figure 5:
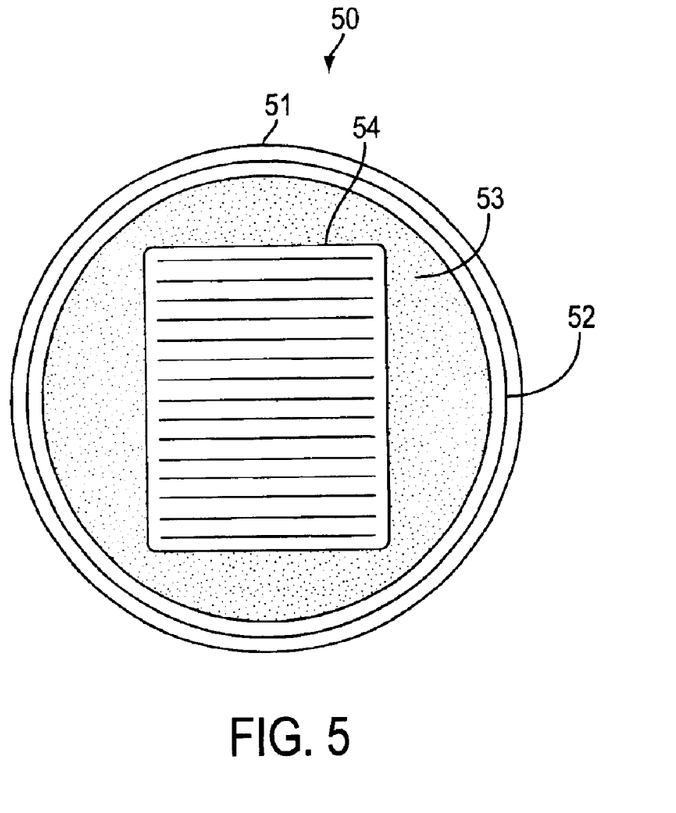
FIG. 5 is a diagrammatical representation of another embodiment of the present invention where the gel-swellable layer is secured onto the inner surface of buffer tube.

FIG. 5 shows yet another embodiment of the present invention, where a cable or buffer tube assembly 50 has the gel-swellable layer 52 secured or adhered to the inner surface of buffer tube or outer jacket 51 such that the gel 53 is positioned between the gel-swellable layer 52 and the ribbon stack 54. The gel-swellable inner layer of the buffer tube can be smooth, or have corrugated or any other topology to increase or reduce contact area engaged with gel and as sliding or contact surface with ribbons. It should be noted, that the ribbon stack 54 can be replaced with loose fibers or a single fiber ribbon or any common fiber configuration. Further, the gel-swellable layer 52 can be secured or adhered to the jacket or tube 51 by any acceptable or commonly used means, including co-extrusion with the tube 51.

Figure 6:
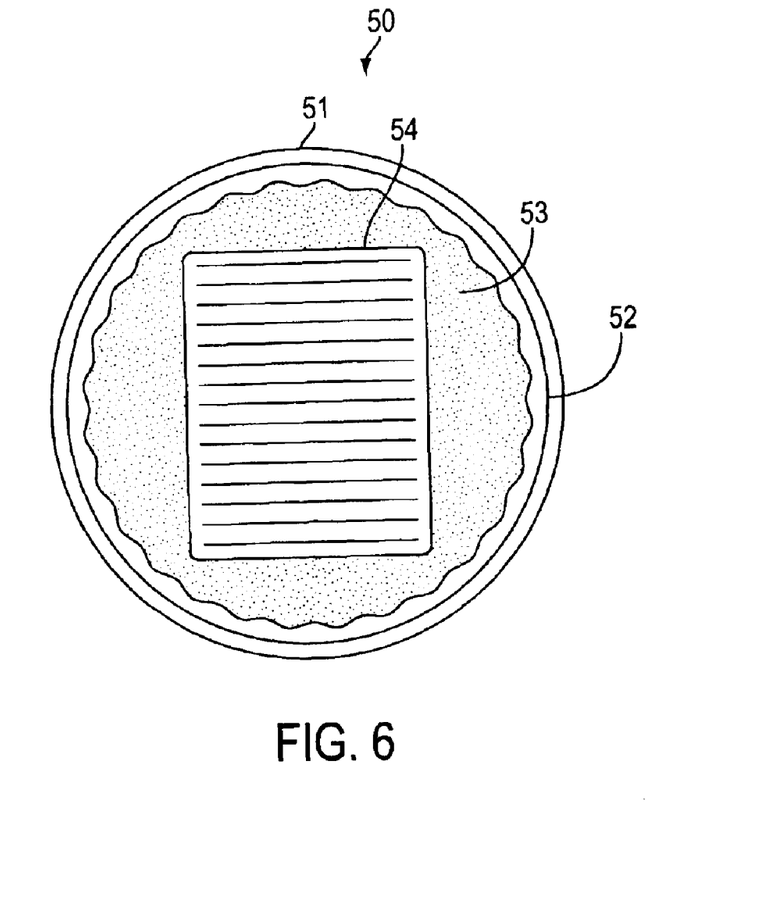
FIG. 6 is an alternate embodiment of the present invention shown in FIG. 5, where the gel-swellable layer is not smooth.

FIG. 6 shows an alternate embodiment of the present invention as shown in FIG. 5, where the gel-swellable layer 52 on the inner surface of the tube 50 is not smooth, but is corrugated or has longitudinally running grooves.

It is of course understood that departures can be made from the preferred embodiments of the invention by those of ordinary skill in the art without departing from the spirit and scope of the invention that is limited only by the following claims.

We claim:

1. A fiber optic cable, comprising:
   an outer layer;
   at least one optical fiber disposed inside said outer layer;
   at least one gel-swellable portion to an inner surface of said outer layer; and
   a water resistant gel positioned adjacent to said gel-swellable portion and disposed between said outer layer and said optical fiber;
   wherein said gel-swellable portion has a density of less than 0.90 g/cc and said outer layer has a density of at least 0.90 g/cc.

2. The fiber optic cable according to claim 1, wherein said at least one gel-swellable portion is a continuous layer surrounding said at least one optical fiber.

3. The fiber optic cable according to claim 1, wherein said at least one gel-swellable portion has an uneven thickness.

4. The fiber optic cable according to claim 1, wherein said at least one gel-swellable portion has a smooth surface.

5. The fiber optic cable according to claim 1, wherein said at least one gel-swellable portion has at least one groove in a surface of said at least one gel-swellable portion.

6. The fiber optic cable according to claim 1, wherein said at least one gel-swellable portion is made from at least one longitudinally running strip.

7. The fiber optic cable according to claim 1, further comprising a second gel-swellable portion positioned between said gel-swellable portion and said at least one optical fiber.

8. The fiber optic cable according to claim 1, wherein said at least one gel-swellable portion has a corrugated surface which is adjacent to said gel.

9. The fiber optic cable according to claim 1, wherein said at least one gel-swellable portion contacts said inner surface of said of said outer layer.

10. The fiber optic cable according to claim 1, wherein said at least one gel-swellable portion is one of a copolymer or terpolymer of polyethelene.

11. The fiber optic cable according to claim 1, wherein said gel-swellable portion swells more than 10% at 85° C.

12. The fiber optic cable according to claim 1, wherein said gel is a polyolefin oil based gel.

13. The fiber optic cable according to claim 1, wherein said at least one gel-swellable portion is a polyolefin swellable material.

14. The fiber optic cable according to claim 1, wherein the material of said at least one gel-swellable portion is softer than the material of said outer layer.

15. A fiber optic cable, comprising:
   an outer layer;
   at least one optical fiber;
   a water resistant gel disposed between said at least one optical fiber and said outer layer; and
   at least one gel-swellable portion proximate to one of an inner surface of said outer layer and an outer surface of said optical fiber.
   wherein said gel-swellable portion is made from a material softer than said one of said inner surface and said outer surface to which said gel-swellable portion is proximate to, and
   wherein said at least one gel-swellable portion has a density less than 0.90 g/cc.

16. The fiber optic cable according to claim 15, wherein said at least one gel-swellable portion is a continuous layer.

17. The fiber optic cable according to claim 15, wherein said at least one gel-swellable portion has an uneven thickness.

18. The fiber optic cable according to claim 15, wherein said at least one gel-swellable portion has a smooth surface.

19. The fiber optic cable according to claim 15, wherein said at least one gel-swellable portion has a groove in a surface of said at least one gel-swellable portion.

20. The fiber optic cable according to claim 15, wherein said at least one gel-swellable portion is made from at least one longitudinally running strip.

21. The fiber optic cable according to claim 15, further comprising a second gel-swellable portion positioned between said at least one gel-swellable portion and the other of said outer surface and said inner surface.

22. The fiber optic cable according to claim 15, wherein said at least one gel-swellable portion is one of a copolymer or terpolymer of polyethelene.

23. The fiber optic cable according to claim 15, wherein said gel is a polyolefin oil based gel.

24. The fiber optic cable according to claim 15, wherein said at least one gel-swellable portion is a polyolefin swellable material.

25. The fiber optic cable according to claim 15, wherein said at least one gel-swellable portion has a corrugated surface.

26. The fiber optic cable according to claim 15, wherein said at least one gel-swellable portion swells more than 10% at 85° C.

27. The fiber optic cable according to claim 15, wherein said at least one gel-swellable portion contacts said one of an inner surface of said outer layer and an outer surface of said optical fiber.

* * * * *